(12) United States Patent
Dichek

(10) Patent No.: US 9,939,459 B2
(45) Date of Patent: Apr. 10, 2018

(54) SYSTEM AND METHOD FOR PERFORMING A TEST ON A PITOT PROBE HEATING ELEMENT

(71) Applicant: The Boeing Company, Chicago, IL (US)

(72) Inventor: Daniel J. Dichek, Seattle, WA (US)

(73) Assignee: The Boeing Company, Chicago, IL (US)

(*) Notice: Subject to any disclaimer, the term of this patent is extended or adjusted under 35 U.S.C. 154(b) by 178 days.

(21) Appl. No.: 15/132,700

(22) Filed: Apr. 19, 2016

(65) Prior Publication Data

US 2017/0299626 A1   Oct. 19, 2017

(51) Int. Cl.
*G01P 21/02*   (2006.01)
*G01F 1/46*   (2006.01)

(52) U.S. Cl.
CPC .............. *G01P 21/025* (2013.01); *G01F 1/46* (2013.01)

(58) Field of Classification Search
CPC . B64D 43/02; G01F 1/46; G01P 5/165; G01P 21/025; G01P 5/16; G01P 5/14
See application file for complete search history.

(56) References Cited

U.S. PATENT DOCUMENTS

| | | | |
|---|---|---|---|
| 4,121,088 A * | 10/1978 | Doremus | B64D 15/16 219/201 |
| 4,159,501 A | 6/1979 | White | |
| 4,275,603 A * | 6/1981 | Kalocsay | G01P 5/165 165/104.26 |
| 4,839,599 A | 6/1989 | Fischer | |
| 4,931,721 A | 6/1990 | Berrigan et al. | |
| 5,936,536 A | 8/1999 | Morris | |
| 6,414,282 B1 * | 7/2002 | Ice | G05D 23/1913 219/209 |
| 6,430,996 B1 | 8/2002 | Anderson et al. | |
| 9,428,279 B2 * | 8/2016 | Ganguli | B64D 43/02 |
| 2003/0048203 A1 * | 3/2003 | Clary | G01C 23/00 340/945 |
| 2011/0184701 A1 | 7/2011 | Orme et al. | |
| 2016/0280391 A1 * | 9/2016 | Golly | B64D 43/02 |
| 2016/0334253 A1 * | 11/2016 | Querry | G01P 5/14 |

* cited by examiner

*Primary Examiner* — David A Rogers
(74) *Attorney, Agent, or Firm* — Thompson Hine LLP

(57) ABSTRACT

A system for testing a pitot probe heating element includes first and second probes, measuring signals selected from a first signal representing a differential electric current between supply and return wires of the heating element, a second signal representing a residual voltage with respect to ground in the heating element, and a third signal representing ambient electric fields with respect to ground in the heating element; a signal acquisition component that selectively and sequentially applies a test voltage to the heating element to generate the selected signals and receives the selected signals measured by the first and second probes; a signal processing component that receives the selected ones of the first, second, and third signals, processes them, and extracts measurements from the data to generate results indicative of a condition of the heating element; a device control component that generates a display; and a display component.

20 Claims, 6 Drawing Sheets

SYSTEM AND METHOD FOR PERFORMING A TEST ON A PITOT PROBE HEATING ELEMENT

TECHNICAL FIELD

This disclosure is directed to testing devices and, more particularly, to systems and methods for performing a test on a pitot probe heating element without having to remove the pitot probe from its mount on an aircraft.

BACKGROUND

A pitot tube or probe is an instrument typically mounted on a vehicle to measure the relative velocity of a fluid in which the vehicle is moving. In one application a pitot probe is mounted on an aircraft to measure relative air velocity during flight. A pitot probe consists of a hollow tube having an open end pointing in the direction of fluid flow or vehicle movement. The hollow tube contains a fluid, which in the case of an aircraft is air, and the pressure within the pitot probe provides the stagnation pressure measurement, which is combined with the static pressure measured elsewhere on the aircraft to arrive at the dynamic pressure, which is used to determine the indicated air speed of the aircraft.

Pitot probes mounted on aircraft commonly have heating elements called pitot heaters to prevent the tube from becoming clogged with ice, which may occur when the aircraft is operating at altitude or otherwise in cold environments. Some heating elements comprise resistive wires that are mounted within the pitot probe and take the form of a coil that heats the tube to prevent ice from forming during flight. Failure of the heating element leads to indicated pitot probe failure, and can cause the pitot tube to become clogged with ice, which will cause an incorrect air speed reading.

Pitot probe service issues can be very costly. Currently, there is no procedure for testing a pitot probe to predict the failure of its heating element. Consequently, pitot probes are routinely replaced on a time interval basis to avoid degradation or failure during use. A disadvantage with such a replacement system is that intact, functioning pitot probes may be discarded even though they are in good working order, resulting in unnecessary material and labor costs.

Accordingly, there is a need for a system and method for testing a pitot probe heating element to determine if is near failure, so that pitot probes are replaced only when needed. Additionally, a system and method for testing a pitot probe heating element to determine if it is near failure would allow the prevention of costly service interruptions due to pitot probe heater failure by allowing the preemptive replacement of a nearly-failed pitot probe.

SUMMARY

The disclosed method and system are for performing a test on a pitot probe heating element to determine whether the heating element is near failure. The system and method may be performed while the pitot tube remains mounted on a vehicle such as an aircraft. In one embodiment, a system for performing a test on a pitot probe heating element includes a first probe and a second probe, the first probe and the second probe each measuring different diagnostic electrical signals; a signal acquisition component that selectively and sequentially applies a test voltage to the heating element to generate the different diagnostic electrical signals, and receives the different diagnostic electrical signals measured by the first probe and the second probe; a signal processing component that receives the different diagnostic electrical signals from the signal acquisition component, processes the different diagnostic electrical signals, and extracts measurements from the data in the different diagnostic electrical signals to generate results indicative of a condition of the heating element; a device control component that receives the results from the signal processing component and generates a display signal indicative of the results; and a user interface component that communicates the results to a user.

In another embodiment, a system for performing a test on a pitot probe heating element includes a sensing block including a first probe and a second probe, the first probe and the second probe each measuring a different signal selected from a first signal representing a differential electric current between supply and return wires of the heating element, a second signal representing a residual voltage with respect to ground in the heating element, and a third signal representing ambient electric fields with respect to ground in the heating element; and a signal acquisition component that selectively and sequentially applies a test voltage to the heating element to generate the selected ones of the first signal and the second signal, and receives the selected ones of the first signal, the second signal, and the third signal measured by the first probe and the second probe; a computing block including a signal processing component that receives the selected ones of the first signal, the second signal, and the third signal from the signal acquisition component, and processes the selected ones of the first signal, the second signal, and the third signal, and extracts measurements from the data in the selected ones of the first signal, the second signal, and the third signal to generate results indicative of a condition of the heating element; a device logic component having a device control component that receives the results from the signal processing component and generates a display signal indicative of the results; and a user interface component having a display component that receives the display signal from the device control component and displays the results; and a power supply block that supplies electrical power to the sensing block and to the computing block.

In yet another embodiment, a method for performing a test on a pitot probe heating element includes measuring signals selected from a first signal representing a differential electric current between supply and return wires of the heating element, a second signal representing a residual voltage with respect to ground in the heating element, and a third signal representing ambient electric fields with respect to ground in the heating element; selectively and sequentially applying a test voltage to the heating element to generate the selected ones of the first signal and the second signal; and receiving the selected ones of the first signal, the second signal, and the third signal; processing the selected ones of the first signal, the second signal, and the third signal, extracting measurements from the data in the selected ones of the first signal, the second signal, and the third signal, and generating results indicative of a condition of the heating element by the signal processing component; and displaying the results.

Other objects and advantages of the disclosed system and method for performing a test on a pitot probe heating element will be apparent from the following description, the accompanying drawings, and the appended claims.

DETAILED DESCRIPTION

Figure 1:
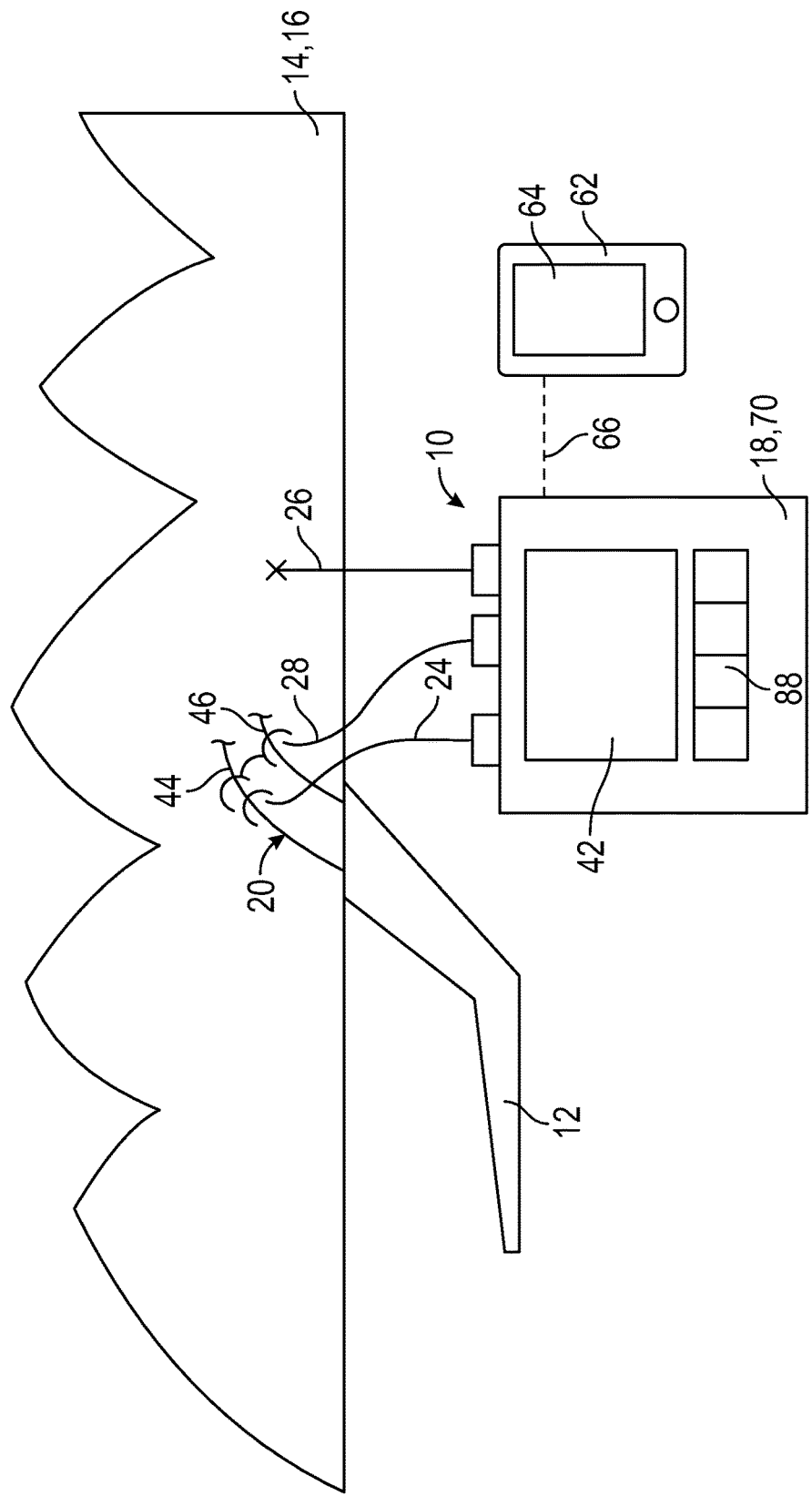
FIG. 1 is a schematic representation of the system for performing a test on a pitot probe heating element, shown attached to the heater wires of a pitot probe.

FIG. 1 shows an embodiment of the disclosed system, generally designated 10, for performing a test on a pitot probe heating element 20. The system 10 is capable of performing the test on a heating element 20 of a pitot probe 12 that may be mounted on the fuselage 14 of a vehicle, which may take the form of an aircraft 16. The system 10 may be capable of performing non-destructive testing of a pitot probe 12 in situ, that is, while attached to the fuselage 14. In particular, the system 10 is capable of detecting compromised insulation in the pitot probe 12 from the flight deck of the aircraft 16. In an embodiment, the system 10 may take the form of a heater health test device 70, which may be contained within a portable housing 18 sized to be carried by hand, and may be powered by batteries internal to the housing, as will be described.

Figure 3:
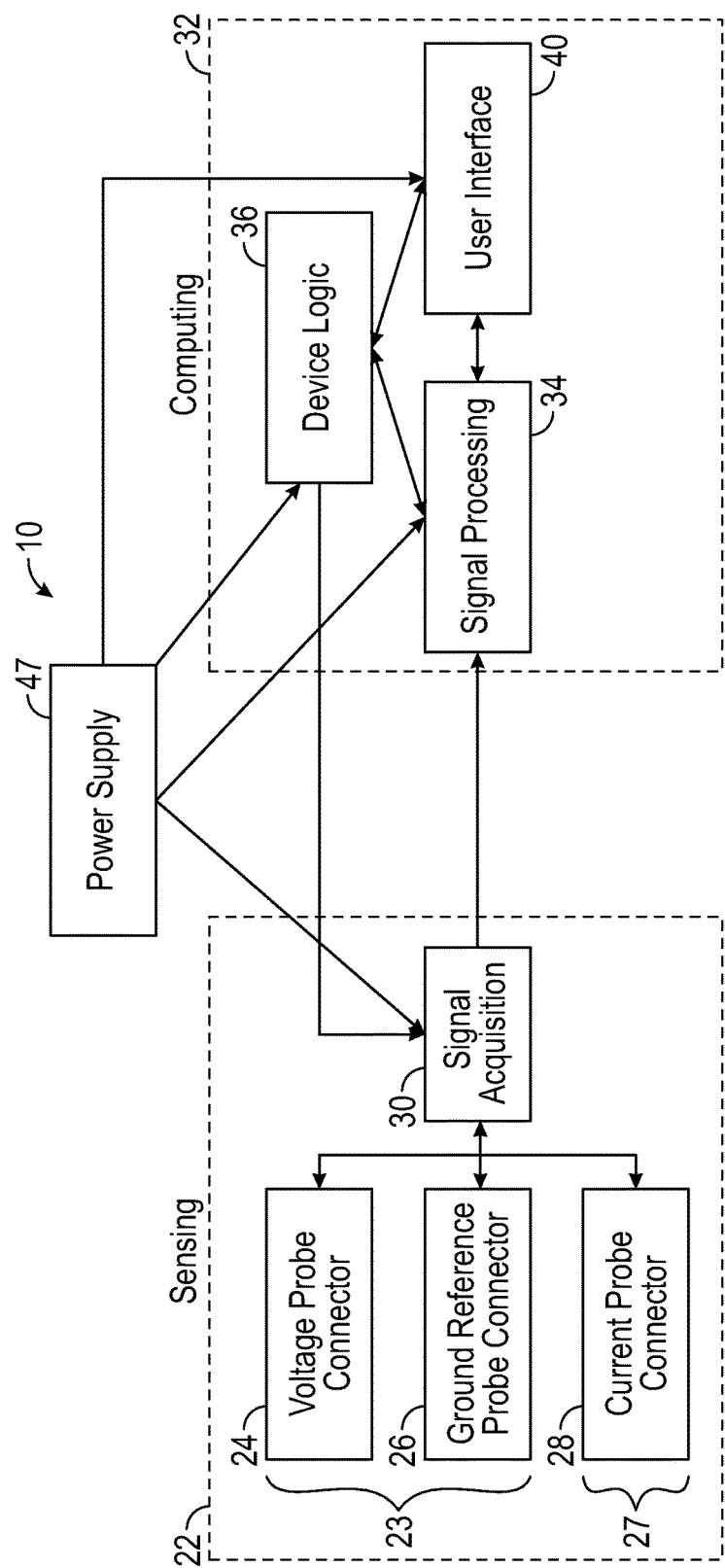
FIG. 3 is a functionality block diagram of the system shown in FIG. 1.

As shown in FIGS. 1 and 3, the system 10 for performing a test on a pitot probe 12 heating element 20 may include a sensing block 22. In embodiments, the sensing block 22 may be an analog sensing block, and may include a first probe 23 that may take the form of a voltage probe connector 24 and a ground reference probe connector 26. A second probe 27 may take the form of a current probe connector 28. Probe 26 may be attached directly to the fuselage 14 of the aircraft 16. The first probe 23 and the second probe 27 each may measure different diagnostic electrical signals, respectively, indicative of the health of the pitot probe heating element 20. The second probe 27 may measure a first signal representing a differential electric current between the supply and return cables or wires 44, 46, respectively, of the heating element 20 (FIG. 1). The first probe 23 may measure a second signal representing a residual voltage with respect to ground in the heating element 20, and a third signal representing ambient electrical fields with respect to ground in the heating element.

In embodiments, the first and second probes 23, 27 may measure voltage and current in the heating element 20 by galvanic connections or with non-contact methods. Galvanic connections may include alligator clips or otherwise physically connecting conductive parts of the system 10 to the heating element 20. Non-contact connections may include Hall-effect sensors, current transformers, or Rogowski coils. The first and second probes 23, 27 may accept test leads that are commonly used with test equipment, such as cables with banana plug, Bayonet Neill-Councelman ("BNC"), or bayonet-type connectors.

The sensing block 22 also may include a system acquisition component 30, which in embodiments may be an analog signal acquisition component, that selectively, and in embodiments sequentially, applies a test voltage to the heating element 20 to generate the selected ones of the first signal and the second signal, and measures the selected ones of the first signal, the second signal, and the third signal transmitted by the first probe 23 and the second probe 27.

The system 10 also may include a computing block 32 that includes a signal processing component 34 that receives the selected ones of the first signal, the second signal, and the third signal from the signal acquisition component 30, processes the selected ones of the first signal, the second signal, and the third signal, and extracts measurements from the data in the selected ones of the first signal, the second signal, and the third signal to generate results indicative of a condition of the heating element 20. The computing block 32 also may include a device logic component 36 having a device control component 38 (see FIG. 5) that receives results from the signal processing component 34 and generates a display signal indicative of the results. The computing block 32 also may include a user interface component 40 having a display component 42 (see FIG. 5) that receives the display signal from the device control component 38 and displays the results. The system 10 also may include a power supply block 47 that supplies electrical power to the sensing block 22 and to the computing block 32.

In an embodiment, the first probe 23 may be selected from the connectors 24, 26 (FIG. 1) to form a pair of current sensing clamps adapted to contact the supply cable 44 and return cable 46 of the heating element 20. The second probe 27 may be a single differential current sensing probe connector 28 adapted to be placed around the supply cable 44 and return cable 46, respectively, to measure leakage current without contacting the heating element 20.

Figure 4:
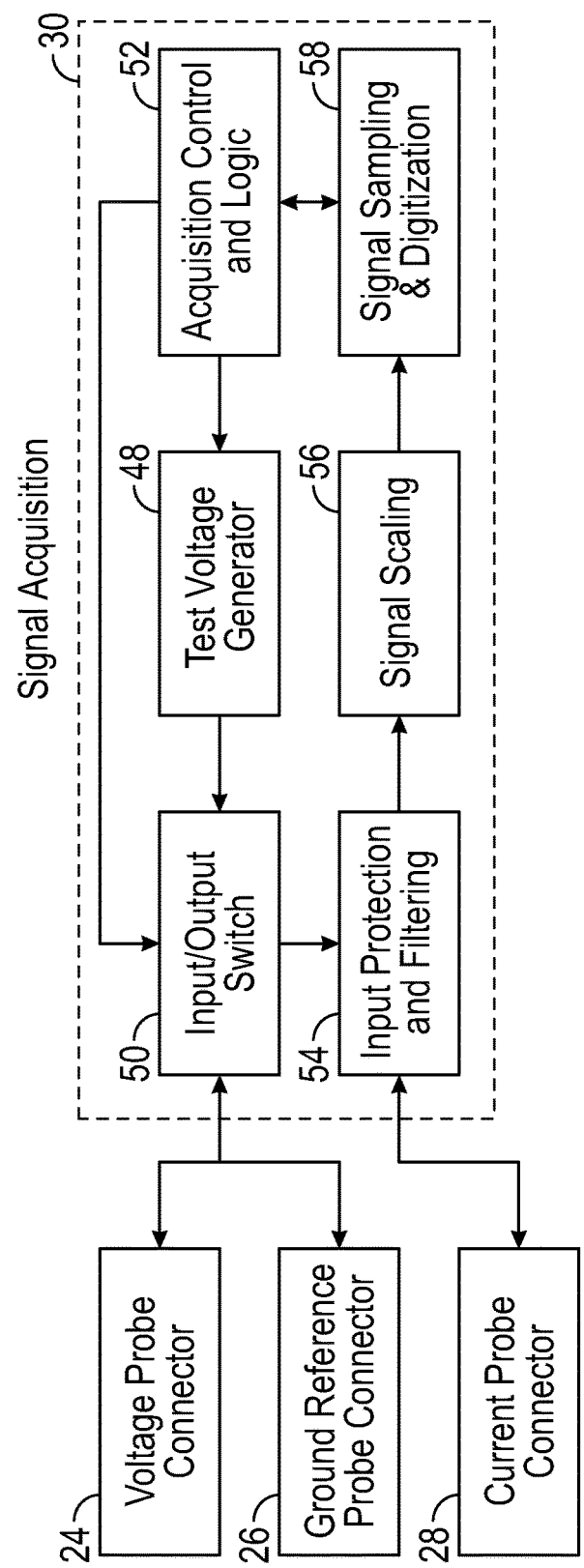
FIG. 4 is a detailed block diagram of the sensing block of the block diagram of FIG. 3.

As shown in FIG. 4, in an embodiment the signal acquisition component 30 may include a test voltage generator 48, an input-output switch 50, and an acquisition control and logic module 52. The acquisition control and logic module 52 may actuate the input-output switch 50 and test voltage generator 48 to generate a test voltage through the input-output switch to the first probe 24, 26 to generate the test voltage. Acquisition control and logic module 52 also may actuate the input-output switch 50 to selectively receive the selected ones of the second signal and the third signal.

In an embodiment, the test voltage generator 48 may be implemented with a digital to analog converter (DAC) and an operational amplifier and power amplifier, or with a programmable gain amplifier and a voltage reference. The input/output switch 50 may be a relay or an analog switch.

The signal acquisition component 30 also may include an input protection and filtering element 54. The input selection and filtering element 54 may include protective circuitry to protect the signal acquisition component 30 from over-current and over-voltage conditions, and may include a filter to attenuate signals that may cause erroneous measurements by the signal acquisition component. The signal acquisition component 30 also may include a signal scaling element 56 that may receive signals from the input protection and filtering element 54 and produce scaled signals in a range that can be processed by the signal acquisition component. The signal scaling element 56 may scale the voltage signals received from the voltage probe connector 24 as part of one or more tests on the heating element 20 to a range that may be processed by the signal sampling and digitization component 58. This function may be performed by a precision voltage divider for converting large voltage signals into smaller ones, or conversely, with an instrumentation amplifier for converting small voltage signals into larger ones.

The signal acquisition component 30 also may include a signal sampling and digitization element 58 that may receive scaled signals from the signal scaling component 56, sample and digitize the scaled signals, and transmit digitized signals to the acquisition control and logic module 52. The acquisition control and logic module 52 may be connected to control the signal sampling and digitization element 58. The signal sampling and digitization component 58 may utilize analog to digital converters (ADCs). Such ADCs may transmit the digitized signal information to the acquisition control and logic component 52.

The acquisition control and logic component 52 may be connected to control the signal sampling and digitization component 58 by modifying its parameters and commanding its functions. The acquisition control and logic component 52 also may be connected to control the test voltage generator 48 and connected to the input/output switch component 50 to control the state of that component. The acquisition control and logic component 52 may enable and disable the test voltage generator 48, and command the amplitude and time duration of the voltages to be generated by the test voltage generator 48. The acquisition control and logic component 52 may be implemented with a microcontroller or field programmable gate array (FPGA), or other device capable of implementing the necessary logic.

Voltage signals may travel from the voltage probe connector 24 through the input/output switch 50 into the input protection and filtering component 54. The input/output switch 50 may be selectively actuated by the acquisition control and logic component 52 to allow the system 10 to switch the galvanic connection to the voltage probe connector 24 between the sensing circuitry chain, made up of input protection and filtering component 54, signal scaling component 56, and signal sampling and digitization component 58, and the test voltage generator 48.

The input protection and filtering component 54 may protect the voltage and current signal scaling component 56 and the signal sampling and digitization component 58 from overcurrent, overvoltage and similar damaging conditions. The input protection and filtering component 54 may utilize protective circuitry, such as crowbars, transient-voltage-suppression ("TVS") diodes, and metal oxide varistors ("MOVs"). The input protection and filtering component 54 also may filter signals that may cause erroneous measurements, such as harmonics of high-frequency signals, and may include an anti-aliasing filter circuit to perform this function.

Voltage signals proportional to the current measured may travel from the current probe connector 28 directly into similar protection and filtering circuitry in the input protection and filtering component 54. These components may be incorporated into the housing 18 of the heater health test device 70, or they may be separate, and provide a voltage signal proportional to the current they measure through a connector (not shown).

Figure 5:
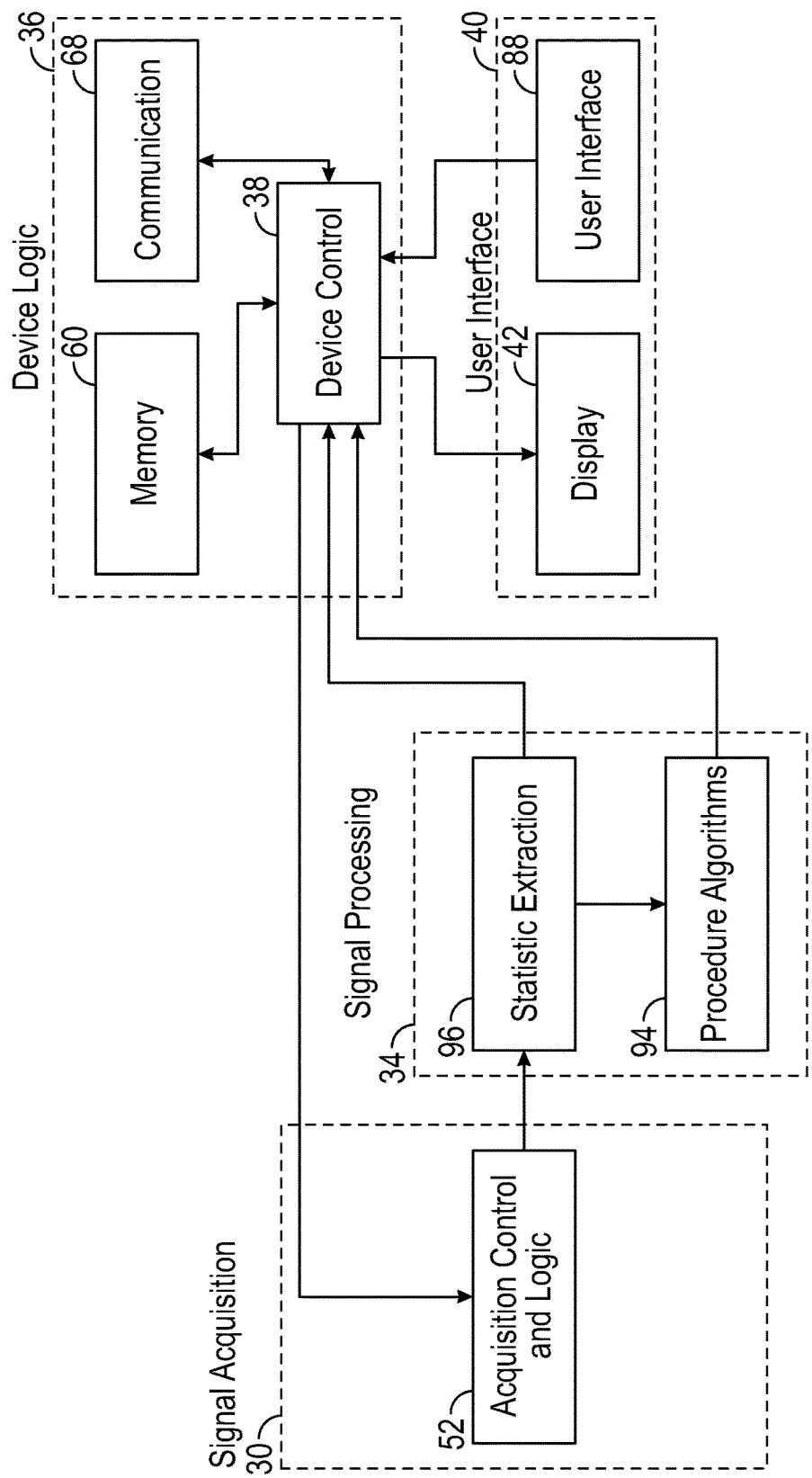
FIG. 5 is a detailed block diagram of the computing block of FIG. 3.

As shown in FIG. 5, the device logic component 36 of the computing block 32 (FIG. 3) may include a memory component 60, in which the device control component 38 records the results of tests in the memory component. In embodiments, the memory component 60 may be selected from a function of the signal processing component 34, a secure digital (SD) card, and a flash memory chip. In embodiments, the memory 60 may be located within the housing 18 (FIG. 1) or on a remote device 62, which may take the form of a portable device such as a laptop computer, a computer tablet, or a smartphone. Similarly, as shown in FIG. 1, the housing 18 may include the display 42, which may take the form of a screen that may appear either on the housing 18 (display 42) or on the portable device 62 (display 64). The portable device 62 may communicate with the components of the system 10 contained within the housing 18 by a link 66 which may take the form of a physical cable, such as a universal serial bus ("USB") cable, or a radio frequency connection such as a Wi-Fi or a Bluetooth connection. The screen 64 may take the form of a color display screen, a liquid crystal display ("LCD"), or a set of light-emitting diode ("LED") indicator lights.

As shown in FIG. 5, the digitized voltage signals representing the voltage and current sensed by the signal acquisition component 30 may be transmitted to the signal processing component 34 of the computing block 32 (FIG. 1). The device logic component 36 and signal processing component 34 of the computing block 32 (see FIG. 3) may be part of a specialized microcontroller or FPGA more suited for processing large amounts of detailed information than the device used to implement the acquisition control and logic component 52. It also may be implemented entirely in software on a separate device (e.g., portable device 62), and receive the digitized signal information by way of a data connection, such as Wi-Fi, Bluetooth, Ethernet, USB, and the like from the heater health test device 70.

Once the signal processing component 34 receives the digitized signal data from the acquisition control and logic component 52, the statistic extraction component 96 applies mathematical formulae to extract statistical measurements from the data. Such measurements as root-mean-squared ("RMS") amplitude, phase angle, frequency, power spectrum density, and peak-to-peak amplitude, are used by the procedure algorithms component 94 of the signal processing component 34, which implement the test procedures to determine whether the insulation of the heating element 20 is compromised or not.

The results of the procedure algorithms component 96 and statistic extraction component 94 are transmitted to the device control component 38 of the device logic component 36. The device control component 38 records these results in memory 60, and communicates them to a user by transmitting an output to the display 42 of the user interface component 40. The display 42 may take the form of a screen or a set of LED indicator lights on the housing 18, or an application window on a separate device 62, collectively represented by display 64 in FIG. 1. A user may use user inputs 88 of the user interface component 40, which may take the form of buttons, switches, knobs, or touchscreens, to send commands to the device control component 38, and thereby control the system 10.

The device logic component 36 may include a communication component 68. The communication component 68 may modify the functionality of the signal processing component 34 and the signal acquisition component 30. The communication component 68 may modify the functionality of the system 10 by allowing it to be reprogrammed or controlled by an application running on a separate device 62, which may take the form of as a laptop, a tablet, or a smartphone. This function may be implemented with any conventional data interface 66, which may take the form of Wi-Fi, Bluetooth, Ethernet, or universal serial bus (USB). If the computing function is implemented on a device 62 separate from the housing 18, the communication component 68 would fill the same purpose by communicating to the device 18. In this form, the communication component 68 may be implemented as a serial data interface to the acquisition and control logic component 52 of the system 10.

In an embodiment, the system 10 may take the form shown in FIG. 1, in which the housing 18 functions as a heater health test device 70, which includes the first probe 23, the second probe 27, the signal acquisition component 30 (FIG. 1), and a second, remote device 62 (FIG. 1) that may include the communication component 68 (FIG. 5), the device control component 38 (FIG. 5), and the display component 42 (FIGS. 1 and 5).

Figure 6:
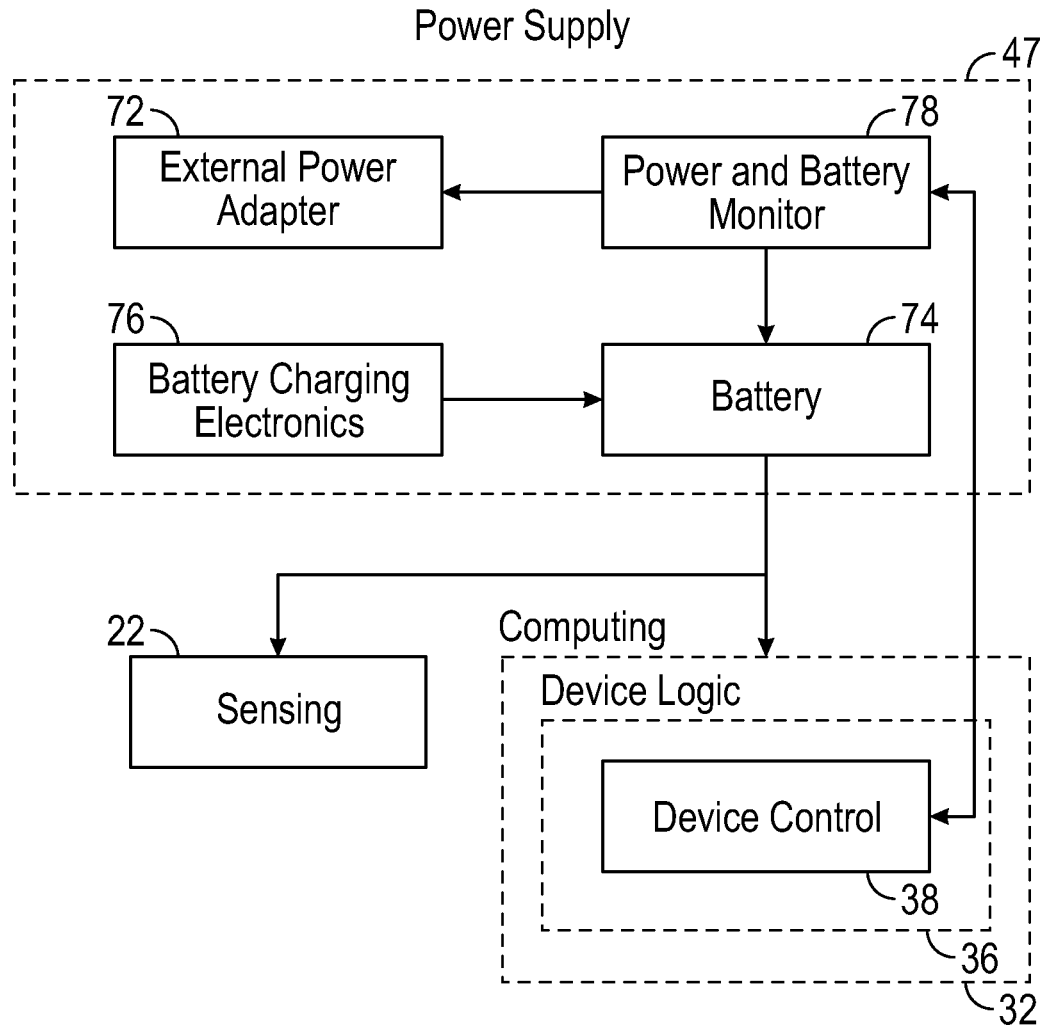
FIG. 6 is a detailed block diagram of the power supply block of FIG. 3.

As shown in FIG. 6, the power supply block 47 may include an external power adapter 72, a battery 74, battery charging electronics 76, and a power and battery monitor 78. The external power adapter 72 may provide the system 10 with external power, either for constant use or for charging the internal battery 74. The battery 74 may be rechargeable, and may be implemented with a lithium polymer cell. The battery charging electronics 76 provide the interface between external power and the battery 74 to ensure that the battery is charged properly.

Both the external power adapter 72 and the battery 74 are monitored by the power and battery monitor 78, which may detect the presence of external power, and the amount of charge left on the battery, and whether the power available to the system 10 is adequate to perform its programmed tests properly. The power and battery monitor 78 may be implemented with comparators, with a specialized power management chip, or as part of a computing device within the heater health test device 70 (FIG. 1).

The power and battery monitor 78 may transmit information about the power and battery to the device control 38 which may transmit it to the user by means of the display 42 (FIG. 5) and use information to make decisions about the state of the system 10. As shown in FIG. 6, the battery 74 is connected to provide electrical power to the sensing component 22, which may include the signal acquisition component 30, the signal processing component 34, and the device logic component 36.

Figure 2:
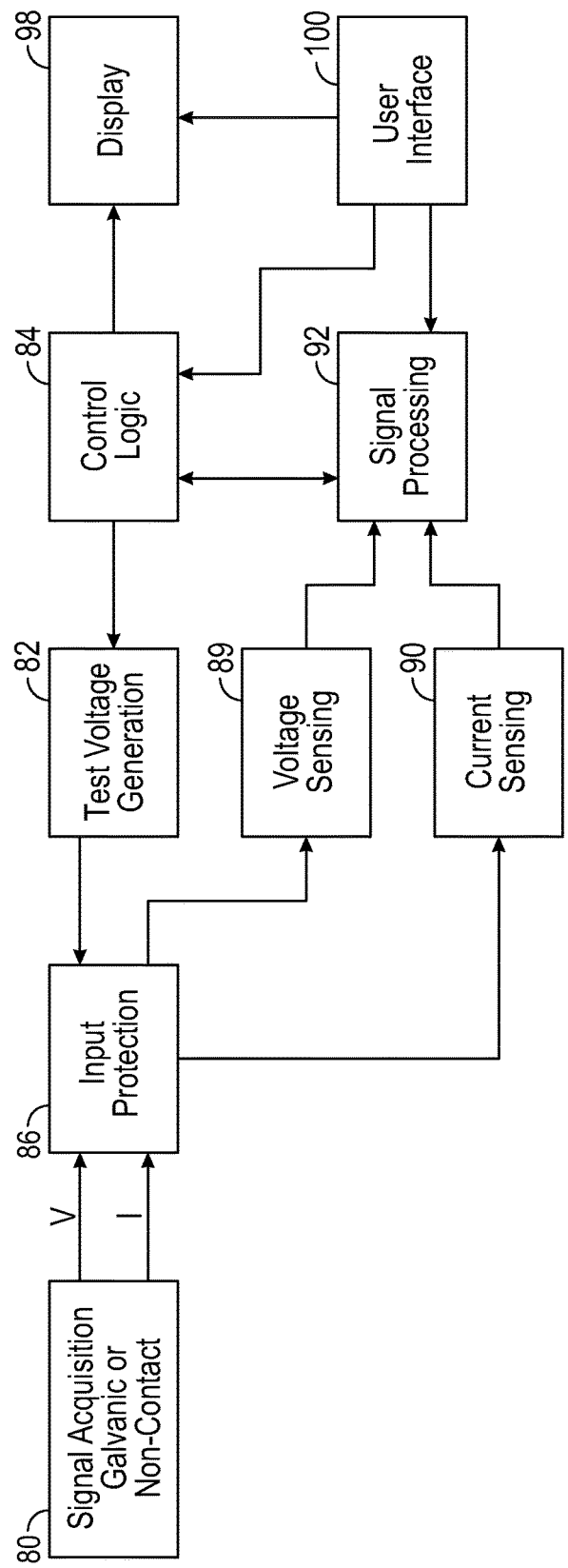
FIG. 2 is a flow chart of a process for performing a test on a pitot probe heating element by the system depicted in FIG. 1.

The method of operation of the system shown in FIGS. 1 and 3-6 is depicted in the flow chart shown in FIG. 2. As shown in box 80, the method may begin by measuring two or more diagnostic electrical signals selected from a first signal representing a differential electric current between the supply wire 44 and the return wire 46 induced by the heating element 20, a second signal representing a residual voltage with respect to ground in the heating element, and a third signal representing ambient electrical fields with respect to ground in the heating element. As shown in FIG. 1, the measurement may be made by connecting the first probe 23 to the heater element 20 by connecting the voltage probe connector 24 to supply cable 44 and ground reference connector 26 to ground on the fuselage 14 of the aircraft or other vehicle 16. The second probe 27 may be connected to the heating element 20 of the pitot tube 12 by connecting lead 28 to input heater cable 44 and output heater cable 46.

The system 10 may be connected to form one, two, or all of the following three tests. In a first test, voltage sensing clamps or connectors 24, 26 of the first probe 23 are connected to the supply cable 44 of the pitot heater and ground on the fuselage 14. The connection may be either a direct mechanical connection or a non-contact connection. As will be described, a known current may be applied through the voltage probe connector 24 to the supply wire 44 of the heater by the test voltage generator 48 through the input/output switch 50, and a first signal in the form of the differential electric current between the supply and return wires 44, 46 will be detected by the second probe 27. As will be described, the first signal may be digitized and transmitted from the signal acquisition component 30 to the signal processing component 34. The differential in current will be measured and used to determine whether there is a leakage or short in the heater cable 20. For example, if the differential is greater than 4 mA, a "Test Failed" indication may be stored in memory 60 and/or displayed on user interface 40, which may include either or both of displays 42, 64.

Conversely, if the differential is at or less than 4 mA, a "Test Passed" indication may be stored in memory 60 and/or displayed on user interface 40, which may include either or both of displays 42, 64.

In a second test, the target pitot heater circuit breakers (not shown) are pulled, and a known voltage is applied by probe 24 to the heater circuit 20 with respect to aircraft ground, and determined from probe 26 connected to fuselage 14. A second signal in the form of the rate of decay of the charge or other properties of the resulting waveform is measured with respect to ground may be measured by probe 26. The second signal, which may be representative of the rate of decay of the charge or other properties of the resulting waveform and indicative of the health of the heater circuit 20, may be digitized by the signal acquisition component 30 and transmitted to the signal processing component 34. For example, for a voltage decrease of 90% in less than 1 millisecond, a "Test Failed" indication may be stored in memory 60 and/or displayed on user interface 40. Conversely, if the voltage fall is at or greater than 1 millisecond, a "Test Passed" indication may be stored in memory 60 and/or displayed on user interface 40.

In a third test, the pitot heater circuit breakers (not shown) may be pulled, and the ambient voltage on floating pitot heater circuit 20 may be measured by probe 24 with respect to aircraft ground, which may be measured by probe 26 connected to fuselage 14. A third signal in the form of the frequency power density and other properties of the resulting waveform on the heater circuit 20 will be measured and digitized. The digitized data of the third signal may be transmitted from signal acquisition component 30 to signal processing component 34 and used to determine the health of the heater circuit and whether there is a short, low impedance to ground or other characteristic indicative of early heater failure present in the circuit 20.

Frequency power density and other signal statistics, such as variance and probability distribution, may be used to determine the state of the heater circuit 20. For example, if over 70% of the power density of a signal is below 400 Hz, a "Test Failed" indication may be stored in memory 60 and/or displayed on user interface 40. If over 10% of the power density is above 10 kHz or if over 50% of the power density is at or over 400 Hz, a "Test Passed" indication may be stored in memory 60 and/or displayed on user interface 40.

As shown in FIG. 2, in box 82, the acquisition control and logic component 52 (FIG. 4) may actuate the test voltage generator 48 to provide a test voltage to the probes 24, 26 through the input protection and filtering component 54, represented by box 84. In an embodiment, the housing 18 (FIG. 1) may include user inputs 88 that may be used to select two or more of the aforementioned tests to be performed. As shown in FIG. 5, the user inputs communicate with the device control component 38 that is connected to and actuates the acquisition control and logic component 52 of the signal acquisition block 30. The acquisition control and logic component 52 may turn off the test voltage generator 48 and actuate the input-output switch 50 to receive a voltage signal from the probes 24, 26, as indicated in box 89 in FIG. 2. If the test performed involves sensing an current, as indicated in box 90, the current may be passed through the input protection and filtering component 54, as well. As indicated in box 92, the signals are processed by the signal scaling component 56 and signal sampling and digitization component 58. The sampling and digitization process may be controlled and sequenced by the acquisition control and logic component 52.

In embodiments, the signal scaling function, which scales the two voltage signals to a range that can be processed by the signal sampling and digitization function 58, may be accomplished by a precision voltage divider for converting large voltage signals into smaller ones, or with an instrumentation amplifier for converting small voltage signals into larger ones. The signal sampling and digitization component 58 will sample and digitize the scaled voltage signals and transmit the digitized signal information to the acquisition logic and control component 52. The acquisition control and logic component 52 may control the signal sampling and digitization by modifying its parameters and commanding its functions.

The acquisition control and logic component 52 also may control the test voltage generator 48 and the state of the input-output switch 50. The acquisition control and logic component 52 also may command the amplitude and time duration of the voltages to be generated.

Once the signal processing component 34 receives the digitized signal data from the acquisition control and logic component 52, it applies mathematical formula, indicated at block 94 in FIG. 5, to extract statistical measurements from the data, indicated at block 96. These measurements may be used by the procedure algorithms 94, which may implement the heater health test procedure to determine if the insulation of the pitot probe cable 20 (FIG. 1) under test is compromised or not.

As further indicated in FIG. 5, the results of the procedure algorithms 94 and statistic extraction functions 96 may be communicated to the device control component 38 of the device logic component 36, which records these results in memory 60. The device control 38 also may communicate the results via communication component 68 to a user via the display 42, indicated at box 98 in FIG. 2. The information may be transmitted by way of the user interface 40, indicated at box 100 in FIG. 2. The user inputs 88 of the user interface 40 may include buttons, switches, knobs, or touchscreens, to send commands to the device control component 38 and thus control the system 10.

The process shown in FIG. 2, in an embodiment, may be employed to perform two or three of the aforementioned three tests on a single pitot tube heater cable 20, and compare the test results to provide a display of the results on display 42 with a higher confidence level. These tests may be performed serially simply by pressing a start button which may be incorporated in the user input 88 (see FIGS. 1 and 5). The sequencing of the tests may be controlled by acquisition control and logic component 52, which receives commands from device control 38. The selection and sequencing of tests may be commanded by a user through user input 88, or selected from a sequence stored in memory 60, or performed automatically by device control 38. In an embodiment, the system 10 may perform two or three of the aforementioned three tests, or optionally others, and combine the results using logic algorithms to arrive at a single "Test Passed" or "Test Failed" result stored in memory 60 and/or appearing on display 42 that may be more reliable than any one of the three tests performed.

The system 10 and method shown in FIG. 2 provide a unique solution to an in-place testing of a pitot probe heating element 20. By combining tests into a single device 10, a more accurate result may be obtained, and data from two or more tests may be combined to provide a conclusion of higher reliability. For example, in the method of FIG. 2, control logic box 84 may include the device logic component 36 (FIG. 3) actuating the signal processing component 34 so that the process step of box 92 would include applying an algorithm to combine the results of two or more of the aforementioned three tests. In one embodiment, the signal processing component 34 would apply signal processing algorithms selected from fast Fourier transform, filters, pattern-recognition algorithms, data fusion, and statistic extraction, or combinations of the forgoing. In another embodiment, or in addition to the forgoing, the signal processing component 34 would apply a decision-making algorithm that compares the results of the signal processing algorithms to known thresholds or ranges in order to arrive at a final result of "Test Passed" or "Test Failed" on the display 42, as part of function box 98.

While the form of apparatus and method disclosed herein constitute embodiments of the disclosed system and method for performing a test on a pitot probe heating element, it is to be understood that the invention is not limited to this precise method and system, and that changes may be made therein without departing from the scope of the invention.

What is claimed is:

1. A system for performing a test on a pitot probe heating element, the system comprising:
   a first probe and a second probe, the first probe and the second probe each measuring different diagnostic electrical signals;
   a signal acquisition component that selectively and sequentially applies a test voltage to the heating element to generate the different diagnostic electrical signals, and receives the different diagnostic electrical signals measured by the first probe and the second probe;
   a signal processing component that receives the different diagnostic electrical signals from the signal acquisition component, processes the different diagnostic electrical signals, and extracts measurements from the data in the different diagnostic electrical signals to generate results indicative of a condition of the heating element;
   a device control component that receives the results from the signal processing component and generates a display signal indicative of the results; and
   a user interface component that communicates the results to a user.

2. The system of claim 1, wherein the different diagnostic electric signal are selected from a first signal representing a differential electric current between supply and return wires of the heating element, a second signal representing a residual voltage with respect to ground in the heating element, and a third signal representing ambient electric fields with respect to ground in the heating element.

3. The system of claim 2, wherein the first probe is selected from a pair of current-sensing clamps adapted to contact the supply cable and the return cable, respectively, of the heating element, and first and second current-sensing probes adapted to be placed around the supply cable and the return cable, respectively, to measure voltage without contacting the heating element.

4. The system of claim 1, wherein the signal acquisition component includes a test voltage generator, an input/output switch, and an acquisition control and logic module; the acquisition control and logic module actuates the input/output switch and test voltage generator to generate a test voltage through the input/output switch to the first probe to generate the test voltage; and actuates the input/output switch to selectively receive the selected ones of the second signal and the third signal.

5. The system of claim 1, wherein the signal acquisition component includes an input protection and filtering element; the input protection and filtering element including protective circuitry to protect the signal acquisition component from overcurrent and overvoltage conditions, and includes a filter to filter signals that may cause erroneous measurements by the signal acquisition component.

6. The system of claim 5, wherein the signal acquisition component includes a signal scaling element that receives signals from the input protection and filtering element and produces scaled signals in a range that can be processed by the signal acquisition component.

7. The system of claim 6, wherein the signal acquisition component includes a signal sampling and digitization element that receives scaled signals from the signal scaling component, samples and digitizes the scaled signals, and transmits digitized signals to the acquisition control and logic module.

8. The system of claim 7, wherein the acquisition control and logic module controls the signal sampling and digitization element.

9. The system of claim 6, further comprising a memory component, and wherein the device control component records the results in the memory component.

10. The system of claim 9, wherein the memory is selected from a function of the signal processing component, a secure digital (SD) card, and a flash memory chip.

11. The system of claim 1, wherein the display component is selected from a screen, a set of LED indicator lights, and an application window on a portable device, the portable device selected from a laptop computer, a computer tablet, and a smartphone.

12. The system of claim 1, further comprising a communication component, the communication component modifying the functionality of the signal processing component and the signal acquisition component.

13. The system of claim 12, wherein the system includes a heater health test device containing the first probe, the second probe, and the signal acquisition component; and a second, remote device including the communication component, the device control component, and the display component.

14. The system of claim 13, wherein the remote device is selected from a laptop computer, a tablet computer, a smartphone, and a desktop computer.

15. The system of claim 13 wherein the communication component includes a serial data interface to the signal acquisition component.

16. The system of claim 1, further comprising a power supply for supplying electrical power to the signal acquisition component, the signal processing component, and the device logic component.

17. The system of claim 16, wherein the power supply includes a rechargeable battery, an external power adapter connected to receive external power for direct use by the system and for recharging the rechargeable battery, a battery charging electronics component connected to monitor charging of the battery, and a power and battery monitor for detecting a presence of a connected source of external power, detecting an amount of charge left on the battery, and determining whether power available to the system is sufficient to perform the test on the pitot tube heating element.

18. A system for performing a test on a pitot probe heating element, the system comprising:

a sensing block including
a first probe and a second probe, the first probe and the second probe each measuring a different signal selected from a first signal representing a differential electric current between a supply wire and a return wire in the heating element, a second signal representing a residual voltage with respect to ground in the heating element, and a third signal representing ambient electric fields with respect to ground in the heating element; and
a signal acquisition component that selectively and sequentially applies a test voltage to the heating element to generate the selected ones of the first signal and the second signal, and receives selected ones of the first signal, the second signal, and the third signal measured by the first probe and the second probe;
a computing block including
a signal processing component that receives the selected ones of the first signal, the second signal, and the third signal from the signal acquisition component, processes the selected ones of the first signal, the second signal, and the third signal, and extracts measurements from the data in the selected ones of the first signal, the second signal, and the third signal to generate results indicative of a condition of the heating element;
a device logic component having a device control component that receives the results from the signal processing component and generates a display signal indicative of the results; and
a user interface component having a display component that receives the display signal from the device control component and displays the results; and
a power supply block that supplies electrical power to the sensing block and to the computing block.

19. A method for performing a test on a pitot probe heating element, the method comprising:
measuring signals selected from a first signal representing a differential electric current between a supply wire and a return wire of the heating element, a second signal representing a residual voltage with respect to ground in the heating element, and a third signal representing ambient electric fields with respect to ground in the heating element;
selectively and sequentially applying a test voltage to the heating element to generate the selected ones of the first signal and the second signal, and receiving the selected ones of the first signal, the second signal, and the third signal;
processing the selected ones of the first signal, the second signal, and the third signal, extracting measurements from the data in the selected ones of the first signal, the second signal, and the third signal, and generating results indicative of a condition of the heating element by the signal processing component; and
communicating the results.

20. The method of claim 19, wherein the processing step includes combining data from two or more tests to provide a conclusion of higher reliability.

* * * * *